(12) United States Patent
Bostwick, IV et al.

(10) Patent No.: US 9,605,803 B2
(45) Date of Patent: *Mar. 28, 2017

(54) APPARATUS AND METHODS TO COUPLE FUEL COMPONENTS TO A FUEL TANK

(71) Applicant: Brunswick Corporation, Lake Forest, IL (US)

(72) Inventors: Christopher Bostwick, IV, Rockford, MI (US); Sean Whelan, Grand Ledge, MI (US); Chad Edward Jaros, Brooksville, FL (US)

(73) Assignee: Brunswick Corporation, Lake Forest, IL (US)

( * ) Notice: Subject to any disclaimer, the term of this patent is extended or adjusted under 35 U.S.C. 154(b) by 730 days.

This patent is subject to a terminal disclaimer.

(21) Appl. No.: 13/763,265

(22) Filed: Feb. 8, 2013

(65) Prior Publication Data

US 2014/0224346 A1    Aug. 14, 2014

(51) Int. Cl.
*B60P 3/00*    (2006.01)
*F17C 3/00*    (2006.01)
(Continued)

(52) U.S. Cl.
CPC .............. *F17C 3/00* (2013.01); *B60K 15/035* (2013.01); *B60K 2015/03453* (2013.01);
(Continued)

(58) Field of Classification Search
CPC .............. B60K 15/03; B60K 15/03177; B60K 2015/03453; B60K 2015/03217;
(Continued)

(56) References Cited

U.S. PATENT DOCUMENTS 6,571,978 B1 *  6/2003  Puempel .......... B60K 15/03177
                                                   220/562
7,318,445 B2    1/2008  Ohshiro
(Continued)

OTHER PUBLICATIONS

United States Patent and Trademark Office, "Restriction Requirement," issued in connection with U.S. Appl. No. 13/763,258, on Jul. 1, 2015, 6 pages.

(Continued)

*Primary Examiner* — Shawn M Braden
(74) *Attorney, Agent, or Firm* — Hanley, Flight & Zimmerman, LLC

(57) ABSTRACT

Fuel tank apparatus and related methods are described. An example method includes placing a first end of a flexible coupling through an access opening formed on a wall of a fuel tank and into a first end of a guide positioned in a cavity of the fuel tank; feeding the first end of the flexible coupling in a first direction through the guide and away from the access opening; redirecting the first end of the flexible coupling towards the access opening by continuing to feed the flexible coupling the first direction; coupling a first fuel component to the first end of the flexible coupling when the first end of the flexible coupling is accessible via the access opening; and directing the flexible coupling in a second direction opposite the first direction via the guide to couple the first fuel component in the cavity of the fuel tank at a position away from the access opening.

20 Claims, 10 Drawing Sheets

(51) Int. Cl.
*B60K 15/035* (2006.01)
*B60K 15/03* (2006.01)

(52) U.S. Cl.
CPC ............... *B60K 2015/03528* (2013.01); *B60K 2015/03557* (2013.01); *Y10T 137/0402* (2015.04); *Y10T 137/86236* (2015.04)

(58) Field of Classification Search
CPC .......... B60K 2015/03243; B60K 2015/03467; F02M 37/103; F02M 37/0094; F02M 37/0011; F02M 37/0082
USPC ......... 220/562; 137/202, 199, 197, 578, 590
See application file for complete search history.

(56) References Cited

U.S. PATENT DOCUMENTS

| | | | |
|---|---|---|---|
| 8,276,778 B2 * | 10/2012 | Eulitz | ..................... B29C 51/12 137/590 |
| 8,561,596 B2 * | 10/2013 | White | .................. B60K 15/061 123/509 |
| 8,789,719 B2 * | 7/2014 | Whelan | .............. F02M 37/0076 220/304 |
| 8,807,162 B2 * | 8/2014 | Monterrey | ............. B63H 21/38 137/202 |
| 9,316,354 B2 | 4/2016 | Bostwick, IV | |
| 2005/0127078 A1 * | 6/2005 | Vorenkamp | ............. B29C 66/61 220/562 |
| 2009/0230133 A1 * | 9/2009 | Takeuchi | ............... B60K 15/03 220/562 |
| 2010/0116366 A1 | 5/2010 | Gattozzi | |
| 2014/0224345 A1 | 8/2014 | Bostwick, IV | |
| 2015/0151631 A1 | 6/2015 | Vulkan | |

OTHER PUBLICATIONS

United States Patent and Trademark Office, "Non-Final Office Action," issued in connection with U.S. Appl. No. 13/763,258, Nov. 4, 2015, 20 pages.

United States Patent and Trademark Office, "Final Office Action," issued in connection with U.S. Appl. No. 13/763,258, Jan. 21, 2016, 14 pages.

United States Patent and Trademark Office, "Notice of Allowance," issued in connection with U.S. Appl. No. 13/763,258, Feb. 26, 2016, 28 pages.

* cited by examiner

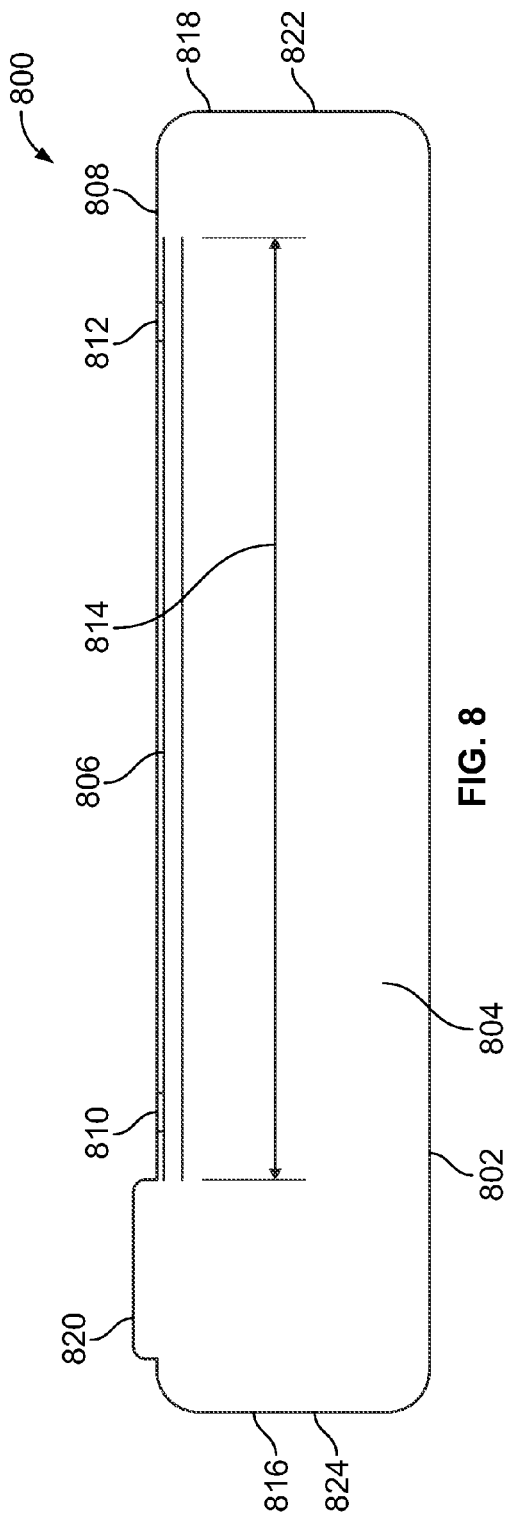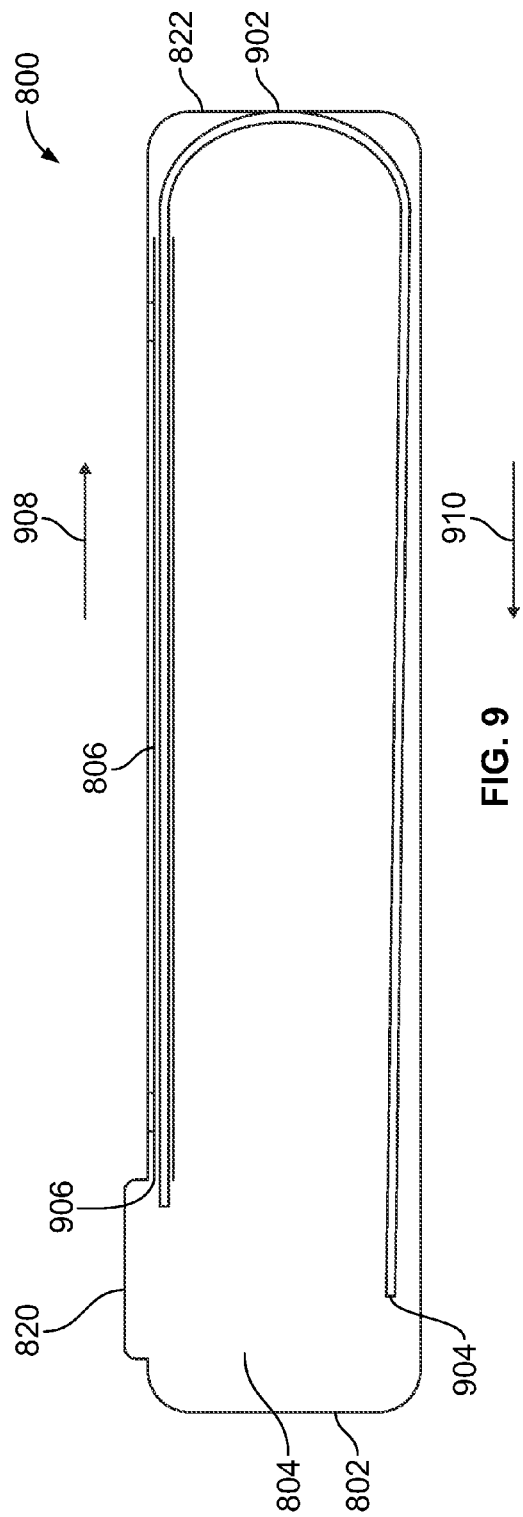

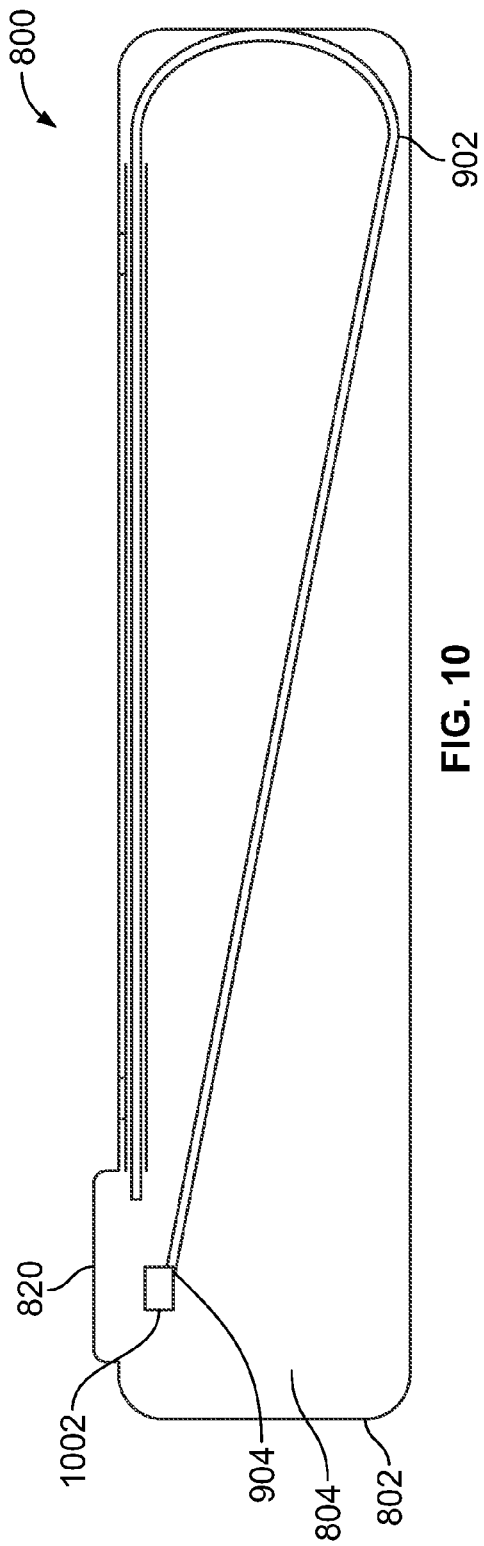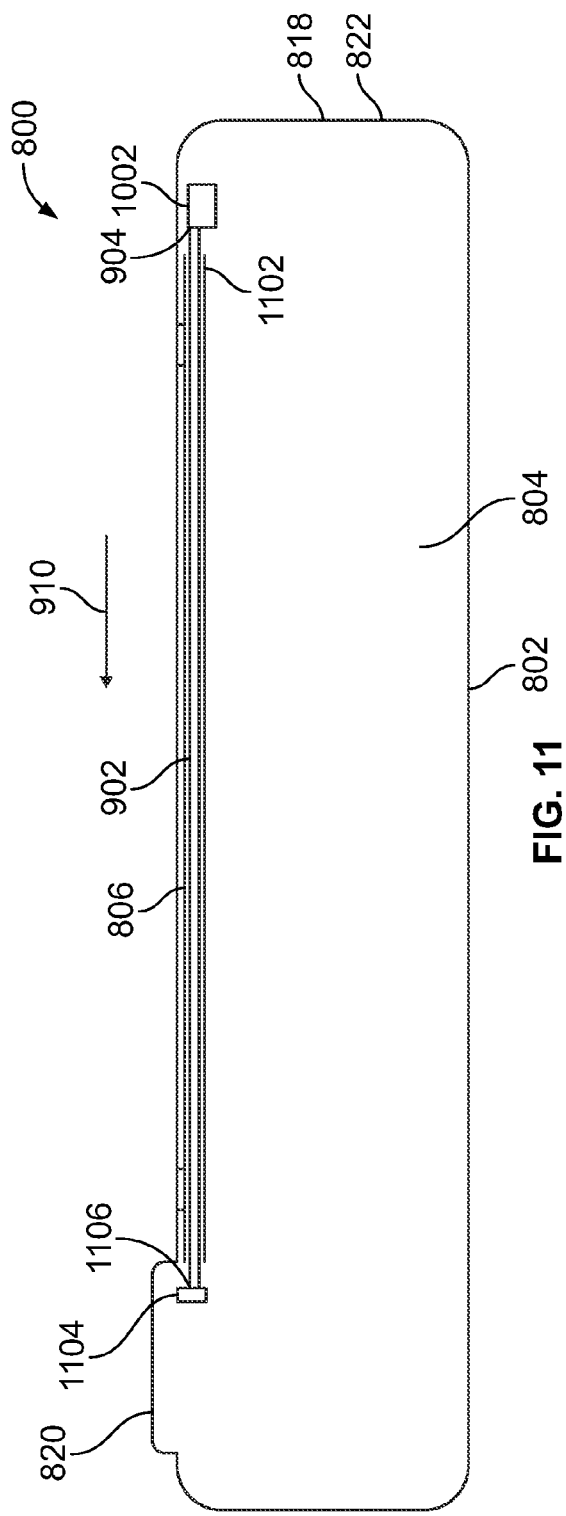

APPARATUS AND METHODS TO COUPLE FUEL COMPONENTS TO A FUEL TANK

FIELD OF THE DISCLOSURE

This patent relates generally to fuel tanks and, more specifically, to apparatus and methods to couple fuel components to a fuel tank.

BACKGROUND

Boats and other marine crafts typically employ a fuel system and/or an evaporative control system having multiple fuel components (e.g., valves) that extend through an external surface (e.g., an upper surface) of a fuel tank. For example, a fuel component such as a grade valve may be coupled to a first end of the fuel tank and another fuel component such as a fuel fill apparatus may be coupled to another end (e.g., the upper surface) of the fuel tank opposite the first end. Although the fuel components may each employ a seal to prevent evaporative emissions from escaping or passing through an interface between the fuel components and the fuel tank, government agencies (e.g., the U.S. Coast Guard, Department of Transportation) have enacted regulations (e.g., title 33 of the Code of Federal Regulations) that require the fuel components coupled to external or outer surfaces of the fuel tank to be accessible for inspection and/or servicing. As a result, multiple access panels may be needed in a marine vehicle to access different fuel components positioned on different ends or areas of the fuel tank, thereby increasing costs.

BRIEF DESCRIPTION OF THE DRAWINGS

FIG. 8 illustrates a cross-sectional view of another example fuel tank assembly disclosed herein shown in a pre-assembled state.

FIG. 9 illustrates a cross-sectional view of the example fuel tank assembly of FIG. 8 in a partially assembled state.

FIG. 10 illustrates a cross-sectional view of the example fuel tank assembly of FIGS. 8 and 9 shown in another partially assembled state.

FIG. 11 illustrates a cross-sectional view of the example fuel tank assembly of FIGS. 8-10 showing a fuel component positioned inside a cavity of a fuel tank.

DETAILED DESCRIPTION

Figure 1:
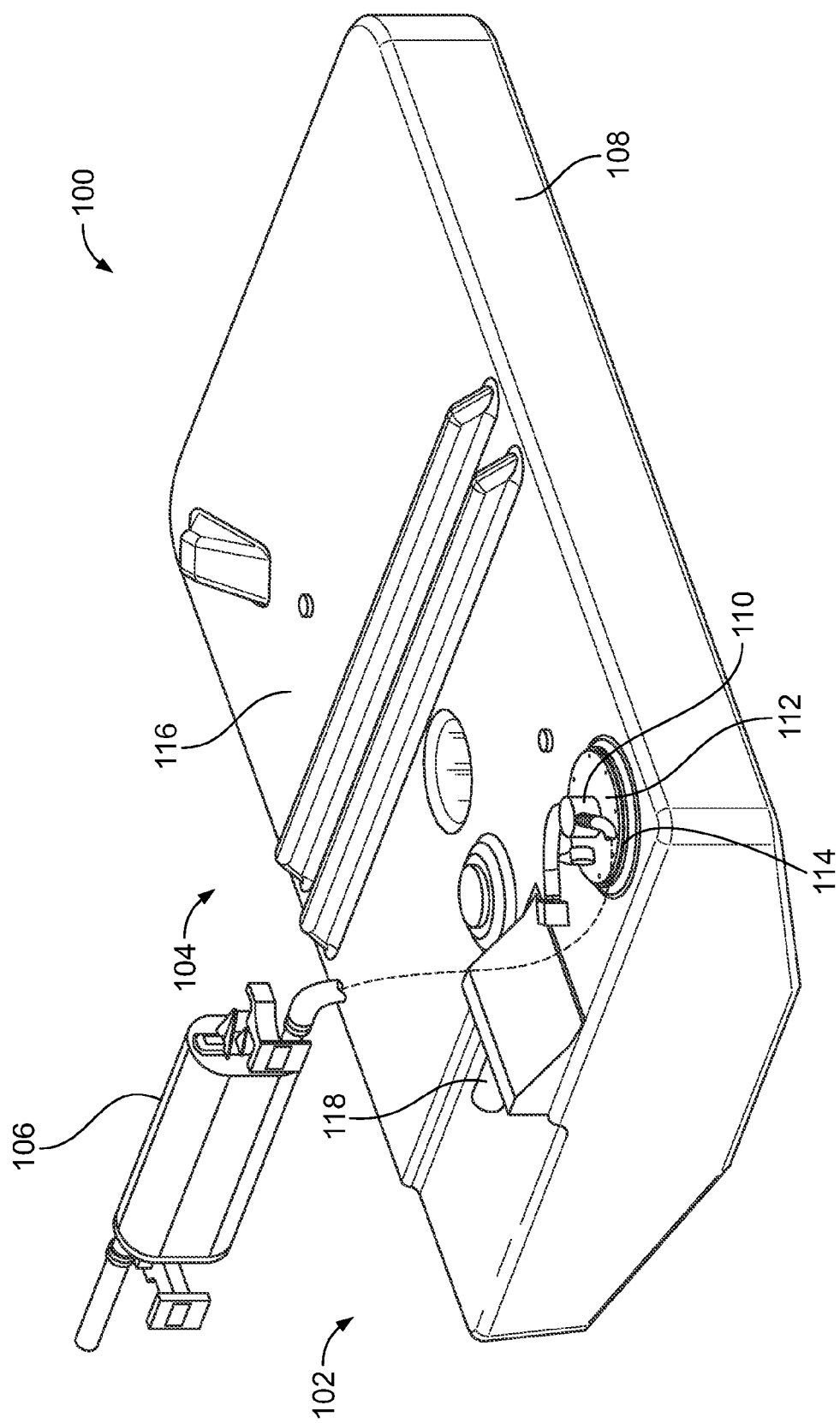
FIG. 1 illustrates an example fuel tank assembly constructed in accordance with the teachings disclosed herein.

Marine fuel tanks often employ fuel systems and/or evaporative control systems having fuel components to vent fuel vapors to the atmosphere and/or enable refueling of the fuel tank. For example, a vent is often employed to equalize a pressure in the fuel tank to accommodate for volumetric changes (e.g., expansion) in the fuel tank during a filling event and/or during temperature fluctuations (e.g., diurnal emissions). The fuel vapors in the fuel tank may be displaced to, for example, the atmosphere and/or a vapor collection apparatus via the fuel components.

Typically, to fluidly couple a cavity of the fuel tank to a vent and/or a vapor collection apparatus, fuel components are often coupled to a wall (e.g., an upper wall) of a fuel tank. However, a fuel component coupled to a wall of the fuel tank typically provides an opening in the wall of the fuel tank through which fuel vapors may escape or emit to the atmosphere, resulting in leakage and/or unwanted release of hydrocarbons or other pollutants to the atmosphere. To prevent emissions or leakage of fuel vapors through an opening in a wall of a fuel tank, a fuel component coupled to the opening of the wall typically employs a gasket and/or a seal. However, in some instances, the seal may fail, erode and/or become dislodged, thereby allowing fuel vapors to escape.

As a result, because the seal may fail, some governmental regulations (e.g., enacted by the U.S. Coast Guard, Department of Transportation) require each fuel component coupled to an opening of a wall of a fuel tank to be accessible for inspection and/or servicing. Typically, some fuel components (e.g., a grade valve) are often positioned on the fuel tank opposite other fuel components (e.g., a fuel fill apparatus or vent valve). Thus, to provide accessibility to multiple fuel components coupled to an exterior surface of a fuel tank, multiple access plates and/or panels may be needed to comply with the government regulations. However, having multiple access panels or openings in a marine vehicle may increase manufacturing costs and/or be aesthetically unappealing.

The example methods and apparatus disclosed herein significantly reduce or eliminate the need to provide multiple access panels and/or openings to a marine vehicle. More specifically, multiple access panels and/or openings are not required to provide access to the plurality of fuel components because at least one of the fuel components is to be positioned and/or disposed inside a cavity of a fuel tank without being coupled to the fuel tank via an opening extending through a wall of the fuel tank. In other words, by positioning the fuel component inside the cavity of the fuel tank, a coupling or opening in the wall of the fuel tank that would otherwise be needed to couple the fuel component to the fuel tank is eliminated. For example, the example fuel tank apparatus disclosed herein may employ only one opening through a wall of the fuel tank, which may provide an access port to access at least one fuel component positioned in the cavity. As a result, the example fuel tank apparatus disclosed herein may require only one access panel or opening to access the fuel components which, in some instances, may significantly reduce manufacturing costs and/or eliminate a need to provide aesthetically unappealing access panels to a floor and/or other surface of the marine craft or vehicle.

As used herein, a "fluid" includes, but is not limited to, a liquid such as fuel (e.g., gasoline), a vapor such as fuel vapor (e.g., gasoline vapor), a gas (e.g., air) and/or any combination or mixture thereof.

FIG. 1 illustrates an example fuel system 100 in accordance with the teachings described herein. The example fuel system 100 of FIG. 1 includes an evaporative control system 102 fluidly coupled to a fuel tank assembly 104. For example, the evaporative control system 102 significantly limits or prevents evaporative emissions (e.g., hydrocarbons) from emitting to the environment or atmosphere. A vapor collection apparatus 106 (e.g., a carbon canister) filters the evaporative emissions (e.g., hydrocarbons) that vent to the atmosphere. More specifically, the vapor collection apparatus 106 may have an emission(s)-capturing or filter material (e.g., an adsorbent material) such as, for example, activated carbon, charcoal, etc., that collects and stores the evaporative emissions. The stored emissions are carried back to a fuel tank 108 of the fuel tank assembly 104 as air flows from the atmosphere into the fuel tank 108 (e.g., during vacuum). A fuel component 110 (e.g., a vent valve) of the fuel tank assembly 104 of the illustrated example fluidly couples the vapor collection apparatus 106 and the fuel tank 108.

As illustrated in FIG. 1, the fuel component 110 is positioned on a cover or clamp 112 that is coupled to an opening 114 formed in a wall 116 of the fuel tank 108. As disclosed in greater detail below, the fuel component 110 is fluidly coupled to one or more fuel components disposed inside the fuel tank 108 to allow fuel vapors and/or air to flow between the fuel tank 108 and the atmosphere (e.g., via the evaporative control system). Additionally, the fuel tank 108 may include a deck fill opening 118 of the fuel tank 108 adjacent the opening 114 to receive a fuel fill apparatus. In other examples, the fuel fill apparatus may be coupled to the cover 112.

Figure 2:
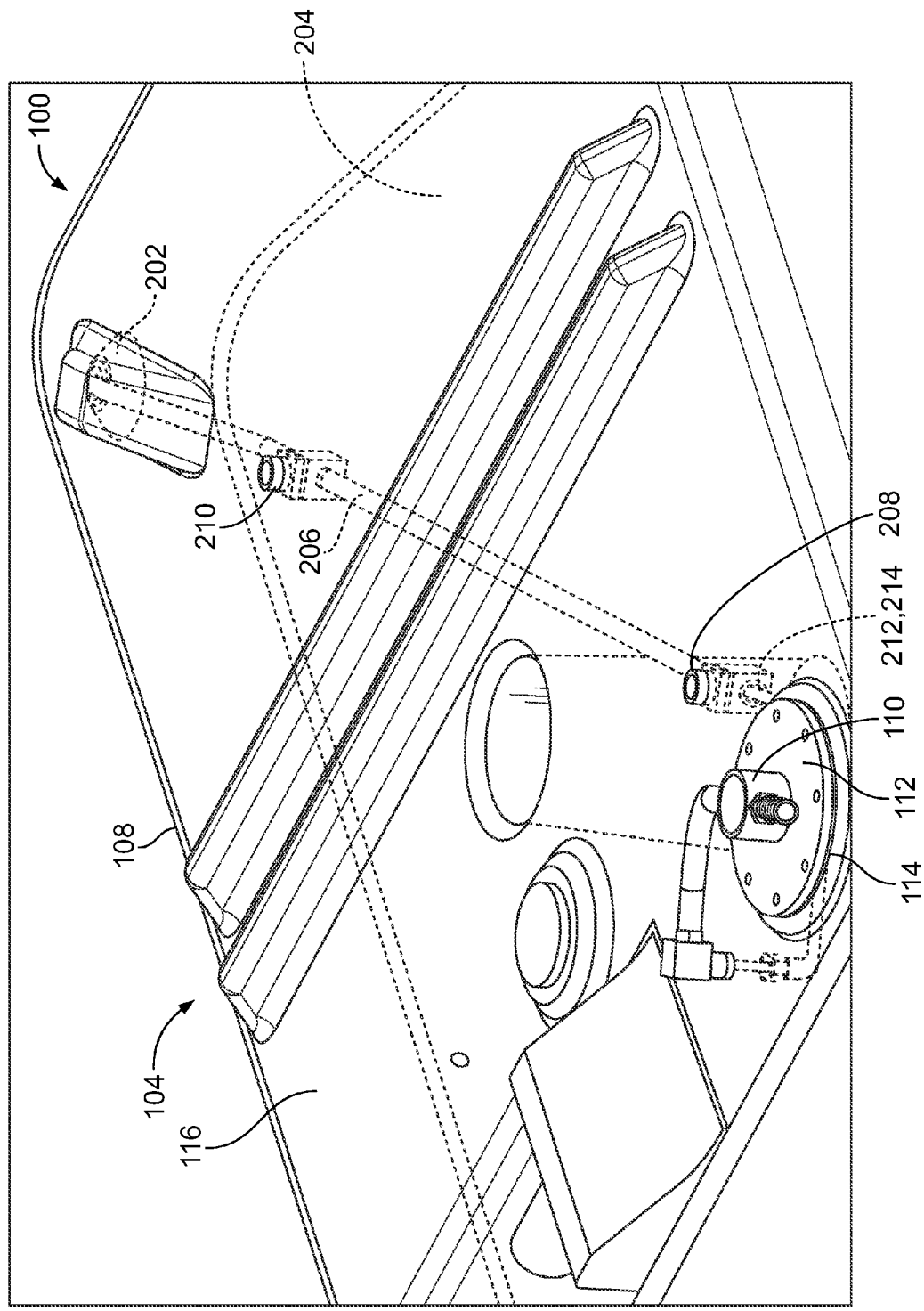
FIG. 2 is a perspective view of the example fuel tank assembly of FIG. 1 having an example fuel component positioned inside a cavity of a fuel tank.

FIG. 2 is a perspective view of the example fuel tank assembly 104 of FIG. 1 illustrating internal components in dashed lines. The example fuel tank assembly 104 includes a fuel component 202 (e.g., a vent valve, a grade valve, etc.) positioned and/or disposed in a cavity 204 of the fuel tank 108. To position the fuel component 202 in the cavity 204, the fuel tank 108 includes a guide, channel, carrier, track or other structure forming a path 206 (e.g., a pipe, conduit or support structure). More specifically, the guide 206 may be coupled to the wall 116 of the fuel tank 108 via a plurality of connectors 208 and 210. As illustrated in FIG. 2, the opening 114 of the fuel tank 108 provides access to the cavity 204 and/or the guide 206.

A flexible coupling 212 (e.g., a hose or tubing) fluidly couples the fuel components 110 and 202. In particular, a first end 214 of the flexible coupling 212 is coupled to the fuel component 110 and a second end (opposite the first end 214) is coupled to the fuel component 202. Additionally or alternatively, as described in greater detail below, the guide 206 and/or the flexible coupling 212 of the illustrated example positions the fuel component 202 in the cavity 204 of the fuel tank 108 to a position spaced away from the access opening 114. After the fuel component 110 is coupled to the flexible coupling 212, the cover 112 is coupled or attached to the opening 114. Although not shown, in some examples, a plurality of fuel components may be positioned in the cavity 204 of the fuel tank 108 via a plurality of guides 206 positioned or formed in the cavity 204.

In some examples, the fuel component 202 may be, for example, a grade valve or a vent valve. Grade valves generally allow for the venting of fuel tanks (e.g., the fuel tank 108) positioned in unusual altitudes and/or vertical angles. In some examples, the fuel component 110 may be, for example, a fill limit vent valve or a vent valve. Fill limit vent valves generally eliminate or substantially reduce the risk of liquid fuel reaching a carbon canister (e.g. the vapor collection apparatus 106) as fuel vapor vents from fuel tanks (e.g., the fuel tank 108).

Figure 3:
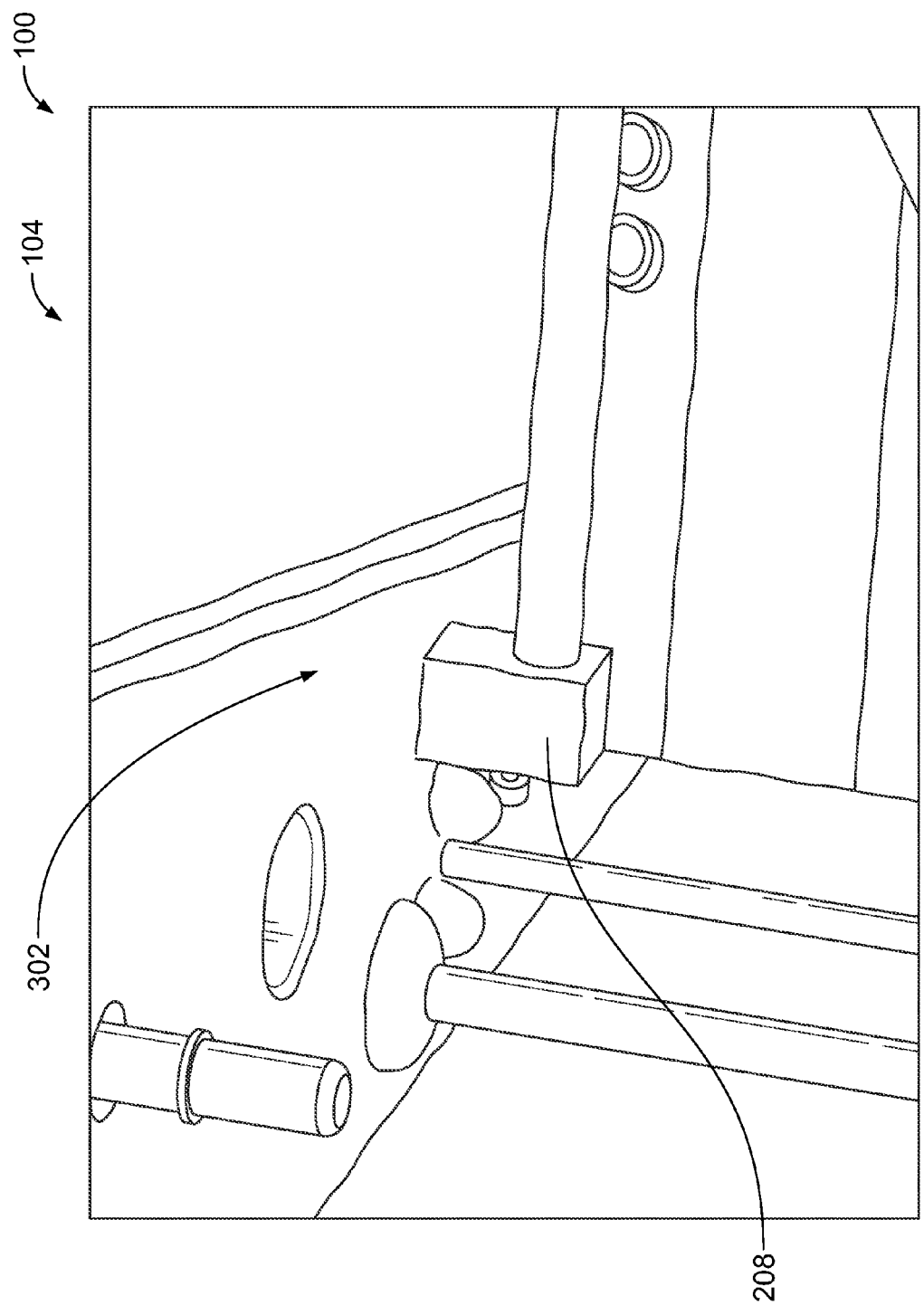
FIG. 3 is an enlarged cross-sectional view of the example fuel tank assembly of FIGS. 1 and 2 showing an interior surface of the cavity.

FIG. 3 illustrates the connector 208 positioned inside the cavity 204 after the fuel tank 108 is formed. The example fuel tank 108 may be formed via, for example, rotational molding, blow molding and/or any other suitable manufacturing process(es). For example, the guide 206 and/or the connectors 208 and 210 may be positioned in a mold prior to the formation of the fuel tank 108. In other words, the guide 206 and/or the connectors 208 and 210 may be insert molded with the fuel tank 108. When insert molded, the connectors 208 and 210 are over molded with a material 302 from which the fuel tank 108 is composed, thereby providing a tight seal and eliminating any openings or passageways (e.g., fluid passages) between the cavity and the wall 116 via the connectors 208 and 210 even though a portion of each of the connectors 208 and 210 extend through an exterior of the wall 116 (see FIGS. 1 and 2). In other examples, the guide 206 and/or the connectors 208 and 210 may be coupled to the fuel tank 108 via any manufacturing process(es) or technique where coupling the connectors 208 and 210 to the fuel tank 108 does not create or require formation of an opening through the wall 116 of the fuel tank 108.

Additionally, the opening 114 may be formed or provided during the molding operation when forming the fuel tank 108. Alternatively, the opening 114 may be formed via secondary manufacturing operations such as, for example, boring, drilling and/or any other suitable manufacturing process(es). Additionally or alternatively, the guide 206 may be integrally formed with the fuel tank 108 via, for example, injection molding. For example, the guide 206 may be integrally formed with the fuel tank 108 such that the guide 206 projects from the wall 116 and into the cavity 204. For example, the fuel tank 108 may be formed via injection molding in separate parts or halves (e.g., two pieces) and subsequently coupled together via, for example, plastic welding.

Providing the fuel component 202 in the cavity 204 of the fuel tank 108 eliminates the need to provide multiple access panels to a marine vehicle. More specifically, an access panel is not required to provide access to the fuel component 202 and/or the connectors 208 and 210 because the fuel component 202 and/or the connectors 208 and 210 do not form openings or passageways through the wall 116 of the fuel tank 108 from which fuel vapors in the cavity 204 can escape to the atmosphere. In other words, by positioning the fuel component 202 inside the cavity 204 and overmolding the connectors 208 and 210 with the material of the fuel tank 108, a coupling or opening in the wall 116 of the fuel tank 108 that would otherwise be needed to couple the fuel component 202 and/or the guide 206 to the fuel tank 108 is eliminated.

Figure 4:
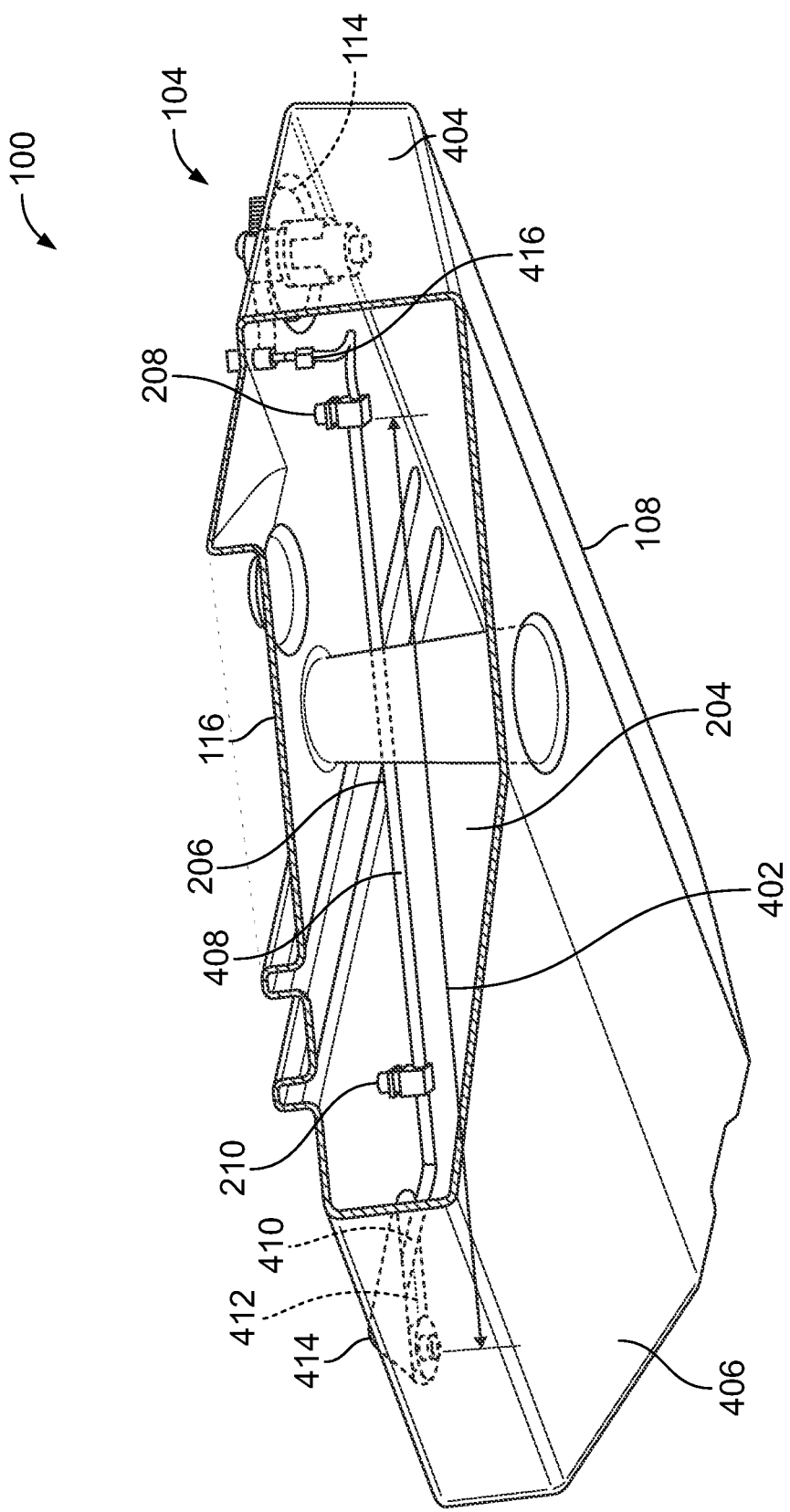
FIG. 4 is a cutaway view of the example fuel tank assembly of FIGS. 1-3.

FIG. 4 is a cutaway perspective view of the fuel system 100 of FIGS. 1 and 2. As shown in FIG. 4, the guide 206 of the fuel tank assembly 104 has a length 402 and extends between a first portion or area 404 of the cavity 204 and a second portion or area 406. As illustrated in FIG. 4, the first area 404 of the cavity 204 is adjacent the opening 114 and the second area 406 of the cavity 204 is spaced away from the opening 114 by a distance defined by at least the length 402 of the guide 206. As shown in FIG. 4, the guide 206 is coupled to the wall 116 via the connectors 208 and 210 in a manner that positions at least a portion 408 of the guide 206 substantially parallel relative to the wall 116 of the fuel tank 108. Additionally and/or alternatively, at least a portion 410 of the guide 206 may be positioned (e.g., at an angle) non-parallel relative to the wall 116. As shown in this example, the portion 410 of the guide 206 adjacent the fuel component 202 is bent relative to the portion 408 of the guide 206. In this manner, the bent portion 410 of the guide 206 helps position the fuel component 202 in a recess 412 defined by a protrusion or body 414. Additionally and/or alternatively, as shown in FIG. 4, the first end 214 of the flexible coupling 212 is coupled to the fuel component 106 via a connector 416 (e.g., a quick disconnect connector).

Figure 5:
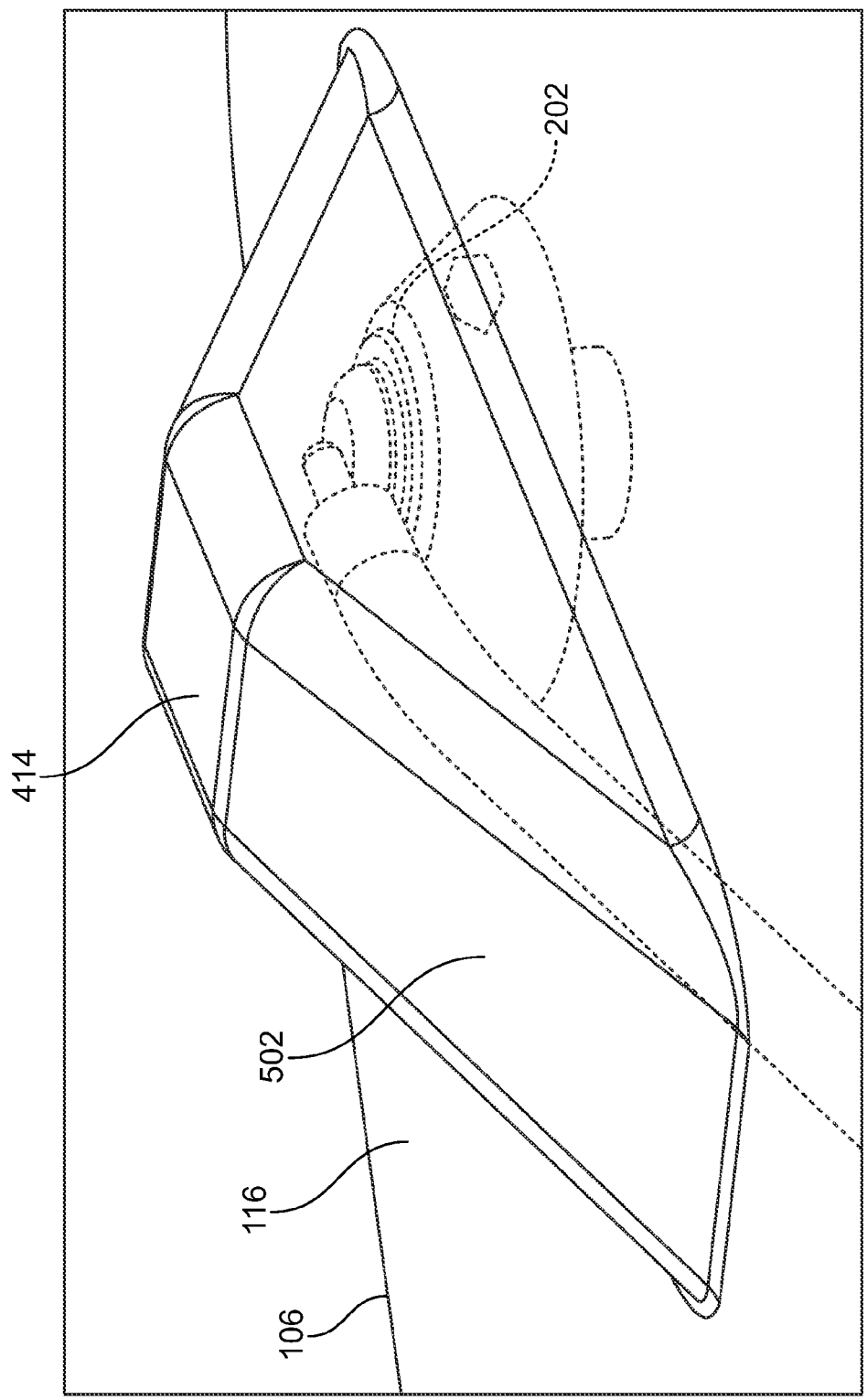
FIG. 5 is an enlarged view of a wall of the example fuel tank of FIGS. 1-4.

FIG. 5 illustrates is an enlarged view of the fuel tank 108 and the protrusion 414. The protrusion 414 protrudes or extends away from the wall 116 of the fuel tank 108. As described in greater detail below, the protrusion 414 enables the fuel component 202 to be positioned inside the cavity 204 of the fuel tank 108 at an elevation substantially even, aligned and/or at least partially above the wall 116 of the fuel tank 108 when the fuel component 202 is positioned inside the cavity 204. In this example, the protrusion 414 includes an angled surface 502 to accommodate or receive the bent portion 410 of the guide 206. The protrusion 414 and, thus, the recess 412 of the fuel tank 108 may be formed via, for example, rotational molding, blow molding and/or any other suitable manufacturing process(es). More specifically, the protrusion 414 of the fuel tank 108 may be formed by using a mold having a cavity corresponding to a profile or shape of the protrusion 414.

Figure 6:
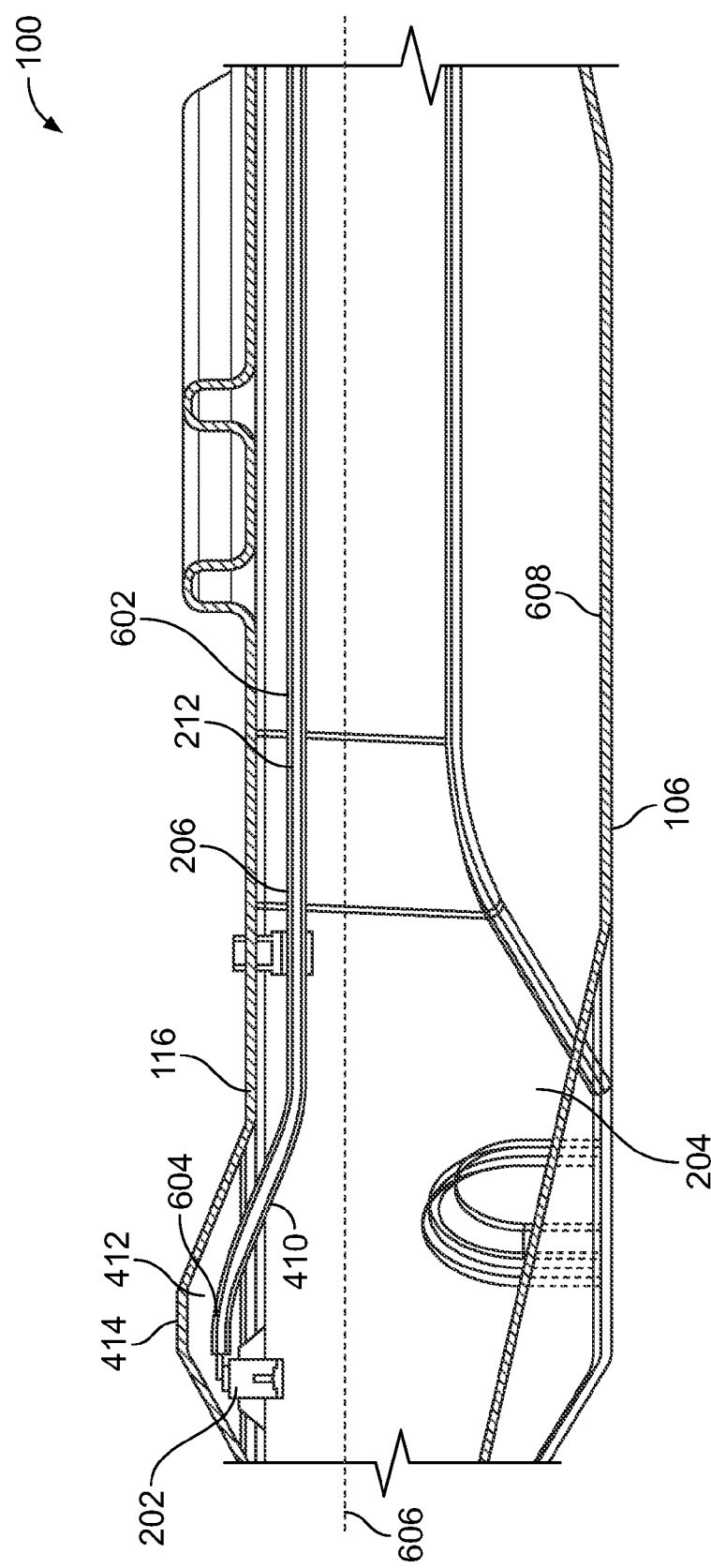
FIG. 6 is a cross-sectional view of the example fuel tank of FIGS. 1-5 showing the example fuel component positioned in a recess of the fuel tank.

FIG. 6 is a cross-sectional view of a portion of the fuel tank 108 of FIGS. 1-5. As shown in FIG. 6, the flexible coupling 212 is at least partially received and supported by the guide 206. More specifically, the guide 206 of the illustrated example is a pipe, tube or conduit that includes a passageway or opening 602 to receive at least a portion of the flexible coupling 212. The passageway 602 may be formed as an aperture extending through and/or along a longitudinal length and/or profile of the guide 206. In some examples, the passageway 602 may be formed via a groove or slot positioned along the length 402 or outer surface of the guide 206. For example, a guide having a slot may define a J-shaped or C-shaped cross-sectional shape.

As illustrated in FIG. 6, the fuel component 202 may be partially disposed in the recess 412 defined by the protrusion 414. Additionally and/or alternatively, the portion 410 of the guide 206 projects and/or is positioned in the recess 412 to guide a second end 604 of the flexible coupling 212 in and/or toward the recess 414. Because the fuel component 202 is coupled to the second end 604 of the flexible coupling 212 and the portion 410 of the guide 206 extends into the recess 412, the fuel component 202 is directed toward the recess 412.

Additionally or alternatively, the protrusion 414, by extending above the wall 116 of the fuel tank 108, enables the fuel component 202 to be positioned or substantially aligned (e.g., substantially even) with the wall 116 when the fuel component 202 is positioned in the recess 412. More specifically, the protrusion 414 and the recess 412 enable the fuel component 202 to be positioned at an elevation or height relative to a ullage 606 of the cavity 204 and/or a bottom surface 608 of the fuel tank 108 that is substantially similar (e.g., even or aligned relative) to an elevation or height of a fuel component that would otherwise be conventionally coupled to the fuel tank 108 via an aperture in the wall 116 in the fuel tank 108. In other words, the recess 412 and the protrusion 414 enable the fuel component 202 to be positioned at an elevation or height relative to the ullage 606 and/or the bottom surface 608 of the fuel tank 108 that is greater than an elevation or height of a fuel component coupled to a fuel tank in which the protrusion 414 and the recess 412 are not provided. For example, in contrast to FIG. 6, the fuel component 202 may be positioned adjacent or below the wall 116. (see FIG. 12). In some such examples, a body (e.g., wings or walls) protruding from the wall 116 toward the cavity 204 may be provided to capture or retain the fuel component 202 in the cavity 204. In other examples, a body, a bracket and/or other holder (e.g., a yoke or fork shaped bracket) may project from an end of the guide 206 to retain the fuel component 202 in the fuel tank 108.

Figure 7:
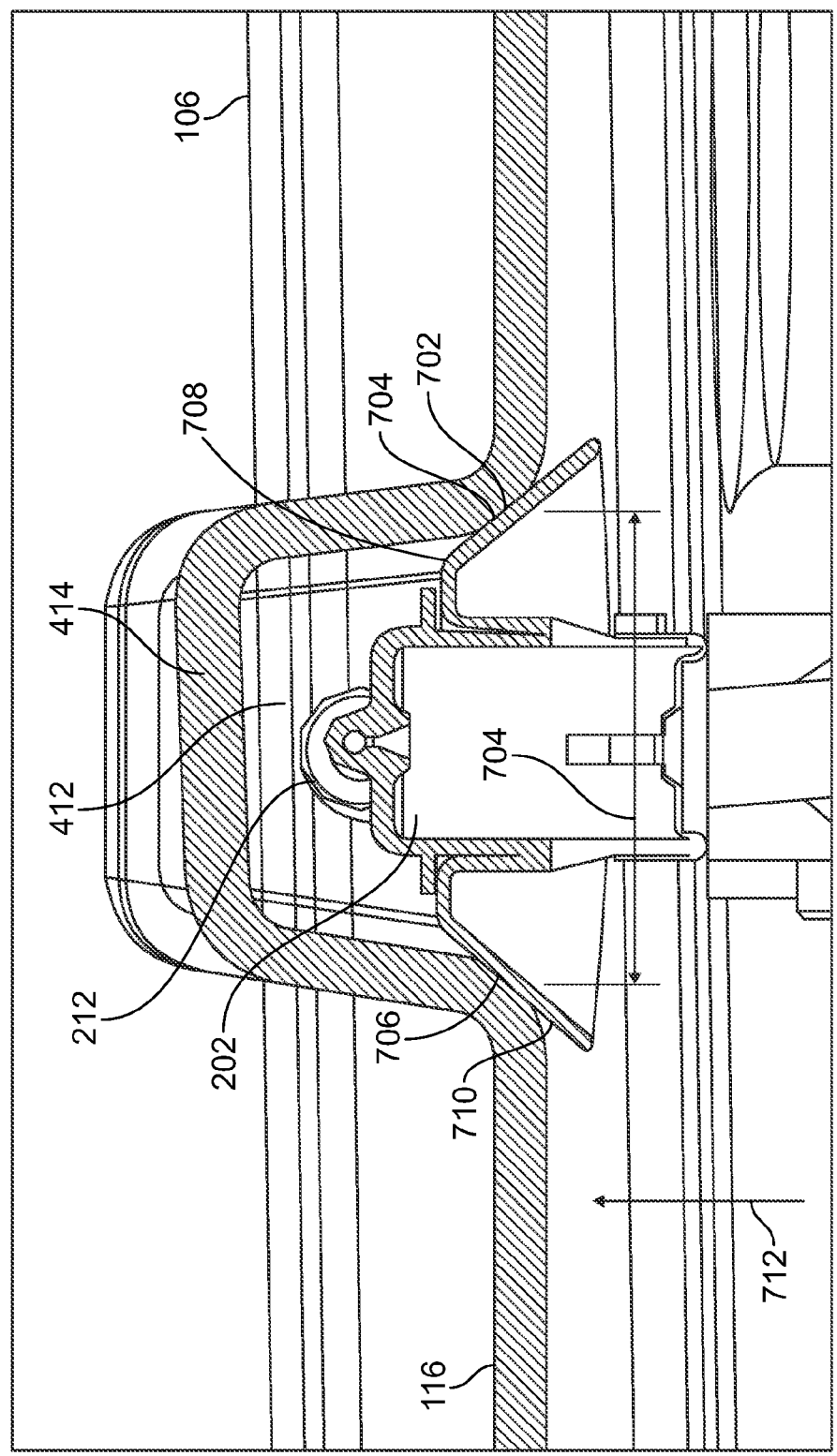
FIG. 7 is a cross-sectional view of the example fuel component positioned in the recess of the example fuel tank assembly of FIGS. 1-6.

FIG. 7 is a cross-sectional view of the fuel component 202 positioned in the recess 412 of the fuel tank 108. More specifically, the fuel component 202 is coupled in the recess 412 via friction fit or interference fit. In particular, the protrusion 414 defines at least one positioning, locating, nesting or clamping surface 702. In particular, the positioning surface 702 of FIG. 7 includes at least two shoulders 704 and 706 spaced apart relative to each other.

The fuel component 202 of the illustrated example employs a body 708 that includes a cylindrical wing and/or annular flange 710 having a tapered profile or surface (e.g., a surface having a varying circumference). In particular, the tapered profile enables the fuel component 202 to abut or engage (e.g., frictionally engage) the shoulders 704 and 706. The shoulders 704 and 706 to position, orient, secure, fix or otherwise couple the fuel component 202 relative to the upper surface of the wall 116 to the fuel tank 108. In this example, the body 708 enables the fuel component 202 to abut or engage the shoulders 704 and 706 of the protrusion 414. In some instances, the flexible coupling 212 may be taut when coupled to the fuel components 110 and 202, which may help retain the fuel component 202 engaged to the shoulders 704 and 706 by providing a force to the body 708 and/or the fuel component in a direction of arrow 712 (e.g., an upward force). By frictionally engaging the shoulders 704 and 706, the fuel component 202 maintains a position near the wall 116 of the fuel tank 108. Additionally and/or alternatively, the shoulders 704 and 706 substantially prevent the fuel component 202 from rotating within the cavity 204. In other words, the shoulders 704 and 706 substantially align the fuel component 202 in the recess 412 and prevent the fuel component 202 from rotating relative to the flexible coupling 212 and/or the protrusion 414. Further, a force imparted by the flexible coupling 212 in a direction toward the opening 114 helps maintain frictional engagement of the body 708 of the fuel component 202 with the shoulders 704 and 706.

FIG. 8 illustrates a cross-sectional view of another example fuel tank assembly 800 disclosed herein shown in a pre-assembled state. The example fuel tank assembly 800 includes a fuel tank 802 that defines a cavity 804 to receive a liquid (e.g., liquid fuel). A track, guide or other support structure 806 is disposed or positioned inside the cavity 804 and coupled to a wall 808 (e.g., an upper surface) of the fuel tank 802 via a plurality of connectors 810 and 812. In particular, the connectors 810 and 812 and the guide 806 are insert molded with the fuel tank 802 so that the connectors 810 and 812 and the guide 806 are coated with a material from which the fuel tank 802 is formed, thereby sealing or eliminating any gaps or openings that may otherwise exist and/or be formed.

The guide 806 of the illustrated example has a length 814 and extends between a first portion 816 of the fuel tank 802 and a second portion 818 opposing the first portion 816. In particular, the first portion 816 is adjacent an access opening or aperture 820 and the second portion 818 is adjacent a side wall 822 that is opposite a side wall 824 adjacent the opening 820. In some instances, as illustrated in FIG. 8, the guide 806 is substantially parallel to the surface 808 of the fuel tank 802. The access opening 820 is formed in the surface 808 of the fuel tank 802 and may be formed during formation of the fuel tank 802 or via secondary manufacturing operations such as, for example, boring, drilling and/or any other suitable manufacturing process(es).

FIG. 9 illustrates the example fuel tank assembly 800 in a partially assembled state. In the partially assembled state of FIG. 9, a flexible coupling 902 is inserted into the guide 806 via the opening 820 of the fuel tank 802. A first end 904 of the flexible coupling 902 is placed through the access opening 820, into the cavity 804 of the fuel tank 802, and into a first end 906 of the guide 806. The first end 904 of the flexible coupling 902 is fed (e.g., pushed) through the guide 806 in a direction illustrated by arrow 908, toward the wall 822, and away from the access opening 820. As the flexible coupling 902 is fed in the first direction 908, the first end 904 of the flexible coupling 902 exits the guide 806 and is redirected back towards the access opening 820 in a second direction 910 opposite the first direction 908. In some instances, as shown in FIG. 9, engagement of the first end 904 with the side wall 822 causes the first end 904 of the flexible coupling 902 to be redirected back towards the access opening 820. Additionally and/or alternatively, a tool with an elongated body and/or a hook and/or clamp-type end (not shown) may be partially inserted into the cavity 804 via the access opening 820 to redirect (e.g., engage and pull) the first end 904 of the flexible coupling 902 toward the access opening 820.

FIG. 10 illustrates the fuel tank assembly 800 of FIGS. 8 and 9 in another pre-assembled state. In FIG. 10, once the first end 904 is redirected toward the access opening 820, a first fuel component 1002 is coupled (e.g., secured, fixed and/or clamped) to the first end 904 of the flexible coupling 902. More specifically, the first end 904 is accessible from an exterior of the fuel tank 802 after the first end 904 of the flexible coupling 902 is redirected toward the access opening 820. As shown in FIG. 10, the first fuel component 1002 is coupled to the flexible coupling 902 when the first end 904 is near the access opening 820, but still within the cavity 804 of the fuel tank 802. In other examples, the first end 904 may be positioned or pulled outside of the cavity 804 to couple the first fuel component 1002 to the flexible coupling 902.

FIG. 11 illustrates the fuel tank assembly 800 of FIGS. 8-10 in another pre-assembled state. In FIG. 11, the first fuel component 1002 is positioned in the cavity 804 adjacent the side wall 822 and away from the access opening 820. After the first fuel component 1002 is coupled to the first end 904 of the flexible coupling 902, as shown in FIG. 1002, the flexible coupling 902 is directed toward the access opening 806 and travels in the second direction 910 within the guide 806. In particular, the guide 806 directs or guides the flexible coupling 902 in the second direction 910. More specifically, the flexible coupling 902 may be directed in the second direction by pulling the flexible coupling 902 in the second direction 910 via the access opening 820.

The flexible coupling 902 is directed in the second direction 910 until the first fuel component 1002 is adjacent a second end 1102 of the guide 806 and/or the side wall 822 of the fuel tank 802. In some examples, the fuel component 1002 may be supported in the cavity 804 by the flexible coupling 904 and/or the guide 806. For example, the guide 806 may include a bracket, an arm or a flange (e.g., a fork or prong) adjacent the second end 1102 of the guide 806 to engage and/or support the fuel component 1002. In some examples, the fuel component 1002 may be suspended in the cavity 804 via the flexible coupling 902 when the flexible coupling 902 is pulled taut toward the opening 820. Additionally and/or alternatively, the first fuel component 1002 may be coupled in the cavity 804 of the fuel tank 802 via frictional engagement with an inner surface formed in the fuel tank 802. For example, the fuel tank 802 may include a protrusion similar to the protrusion 414 of FIGS. 1-7 to receive the fuel component 1002.

After the fuel component 1002 is positioned in the cavity 804, the flexible coupling 902 may be cut or trimmed to a desired length. For example, an initial length of the flexible coupling 902 may be longer to enable the fuel component 1002 to be redirected toward the access opening 806. A connector 1104 (e.g., a quick disconnect connector) may be coupled to a second end 1106 of the flexible coupling 902 after the first fuel component 1002 is positioned in the cavity 804 of the fuel tank 802.

Figure 12:
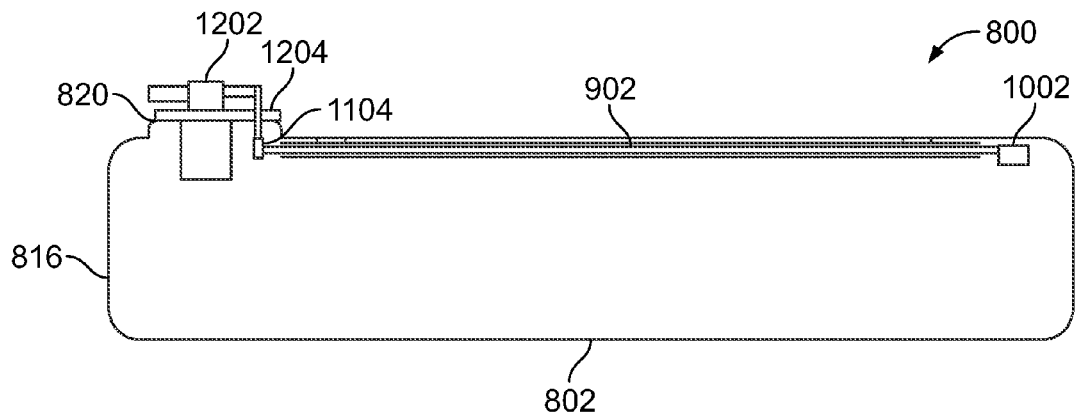
FIG. 12 illustrates a cross-sectional view of the example fuel tank assembly of FIGS. 8-11 shown in an assembled state.

FIG. 12 illustrates the fuel tank assembly 800 of FIGS. 8-11 in an assembled state. In the assembled state, the fuel component 1002 is fluidly coupled a fuel component 1202. More specifically, the second fuel component 1202 is fluidly coupled to the first fuel component 1002 via the flexible coupling 902 and the connector 1104. In other examples, the flexible coupling 902 fluidly couples the fuel component 1002 to the atmosphere and/or a vapor collection apparatus (e.g., the carbon canister 102 of FIG. 1).

As shown in FIG. 12, the fuel component 1202 is positioned adjacent the first portion 816 of the fuel tank 802. In particular, the fuel component 1202 is coupled to and/or integrally formed with a cover or plate 1204. The cover 1204 is coupled or attached to the access opening 820 after the fuel component 1202 is coupled to the flexible coupling 902. Because the fuel component 1002 is fluidly coupled to the fuel component 1202, coupling the fuel component 1202 to the access opening 820 via the cover 1204 enables the fuel component 1002 to vent to the exterior of the fuel tank 802 via the fuel component 1202.

Figure 13:
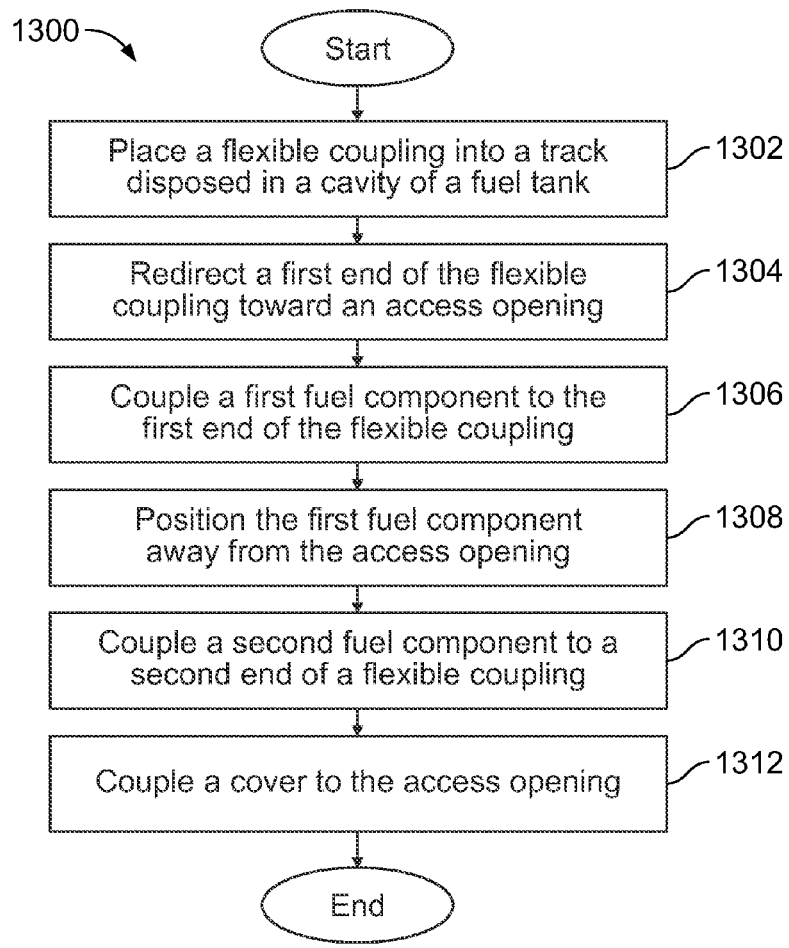
FIG. 13 depicts a flowchart of an example method to assemble an example fuel tank assembly disclosed herein.

FIG. 13 is a flowchart of an example method 1300 that may be used to assemble an example fuel tank assembly disclosed herein such as the example fuel tank assembly 102 of FIGS. 1-7 and the example fuel tank assembly 800 of FIGS. 8-12. While the example method 1300 may be used to assemble an example fuel system herein, one or more of the blocks and/or processes illustrated in FIG. 13 may be combined, divided, re-arranged, omitted, eliminated and/or implemented in any other way. Further still, the example method of FIG. 13 may include one or more processes and/or blocks in addition to, or instead of, those illustrated in FIG. 13, and/or may include more than one of any or all of the illustrated processes and/or blocks. Although the example method 1300 is described with reference to the flowchart illustrated in FIG. 13, many other methods of assembling an example fuel tank assembly may alternatively be used.

The example method 1300 begins by placing a flexible coupling into a track, guide or other support structure disposed in a cavity of a fuel tank (block 1302). More specifically, the first end is placed through an access opening, into the cavity, and into a first end of the guide. The first end is fed through the guide in a first direction away from the access opening. As the flexible coupling is fed in the first direction, the first end is redirected back toward the access opening (block 1304). For example, the first end may be redirected by engaging a side wall of the cavity.

After the first end of the flexible coupling is redirected toward and accessible from the access opening, a first fuel component is coupled to the first end of flexible coupling (block 1306). Once the first fuel component is coupled to the flexible coupling, the flexible coupling is positioned away from the access opening by directing the flexible coupling in a second direction opposite the first direction (block 1308). For example, the flexible coupling may be directed in the second direction by pulling an end of the flexible coupling opposite the first fuel component in the second direction. Pulling the flexible coupling in the second direction causes the first fuel component to be positioned inside the cavity of the fuel tank away from the access opening a distanced defined by at least a longitudinal length of the guide. In some instances, the first fuel component is coupled to an inner surface of the fuel tank via frictional engagement.

After the first fuel component is positioned inside the fuel tank, a second fuel component may couple to a second end of the flexible coupling to fluidly couple the first fuel component and the second fuel component (block 1310). Additionally, the second fuel component may be coupled to the atmosphere and/or vapor collection system, which allows the first fuel component to vent out of the cavity of the fuel tank. In some instances, the second end of the flexible coupling may be trimmed or cut to a desired or proper length prior to attaching the second fuel component to the second end. After the second fuel component is coupled to the flexible coupling, a cover may be coupled or attached to the access opening to enclose the cavity of the fuel tank (block 1312).

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus comprising:
   a fuel tank having an upper wall, a bottom wall and side walls defining a cavity, the fuel tank having an access opening through the upper wall of the fuel tank to enable access to the cavity;
   a guide coupled to the upper wall and disposed in the cavity of the fuel tank, the guide having a first end and a second end defining a length extending in a longitudinal direction proximate an interior surface of the upper wall between a first portion of the cavity adjacent the access opening and a second portion of the cavity spaced away from the access opening, the guide having a channel extending between the first end and the second end, the first end being accessible via the access opening; and
   a flexible coupling to be at least partially received by the channel of the guide and supported by the guide in a direction along the interior surface of the upper wall, a first end of the flexible coupling to receive a first fuel component when the flexible coupling is at least partially disposed in the channel of the guide and the first end of the flexible coupling is adjacent the access opening, the flexible coupling to position the first fuel component adjacent the second end of the guide when a second end of the flexible coupling opposite the first end of the flexible coupling is retracted from the channel of the guide via the access opening.

2. The apparatus of claim 1, wherein the first portion of the cavity is adjacent the access opening and the second portion of the cavity is spaced away from the access opening a distance at least defined by the length of the guide.

3. The apparatus of claim 1, further comprising a second fuel component adjacent the first portion of the cavity.

4. The apparatus of claim 3, wherein the second fuel component comprises a vent positioned on a cover to be coupled to the access opening.

5. The apparatus of claim 3, wherein the flexible coupling is to fluidly couple the first fuel component to the second fuel component.

6. The apparatus of claim 1, wherein the first fuel component frictionally engages a wall defined by a recess.

7. The apparatus of claim 6, wherein the recess is defined by a protrusion extending from the wall adjacent the second portion of the cavity, the protrusion to define one or more shoulders that position a body of the first fuel component relative to an upper surface of the wall when the flexible coupling positions the first fuel component adjacent the second portion of the cavity.

8. The apparatus of claim 1, wherein the guide is substantially parallel relative to the upper wall of the fuel tank.

9. The apparatus of claim 1, wherein the flexible coupling comprises tubing.

10. The apparatus of claim 1, wherein the flexible coupling is positioned within an entire length of the channel defined by the guide.

11. An apparatus comprising:
    a fuel tank defining a cavity, the fuel tank defining an access opening to enable access to the cavity;
    a guide coupled to an upper surface of the fuel tank between a first side wall of the fuel tank and a second side wall of the fuel tank opposite the first side wall, the guide positioned in the cavity and defining a channel to form a pathway through the guide between a first end of the guide and a second end of the guide;
    a flexible coupling to be positioned in the channel of the guide via the access opening, the guide to position the flexible coupling in a substantially horizontal orientation relative to the upper surface when the flexible coupling is positioned in the channel of the guide; and
    a fuel component coupled to the flexible coupling, the flexible coupling to position the fuel component at the second end of the guide when the flexible coupling is positioned within the channel of the guide.

12. The apparatus of claim 11, wherein the fuel component is to engage an inner surface of a recess formed adjacent the second end of the cavity via friction fit to couple the fuel component to the fuel tank when the fuel component is positioned adjacent the second end of the guide.

13. The apparatus of claim 11, wherein the fuel component is positioned adjacent the second end of the guide when at least a portion of the flexible coupling is removed from the channel via the first end of the guide.

14. The apparatus of claim 11, wherein the fuel component is supported by the second end of the guide when the flexible coupling is positioned within the channel of the guide.

15. An apparatus comprising:
    a fuel tank having a plurality of walls defining a cavity;
    an access opening formed through a first wall of the fuel tank to enable access to the cavity from an exterior of the fuel tank, the first wall being positioned between a second wall and a third wall;
    a guide coupled to the first wall of the fuel tank, the guide having a length extending between the second wall and the third wall, the guide having a channel to form a pathway between a first end of the guide and a second end of the guide, the first end of the guide being positioned immediately adjacent the access opening to enable the channel to receive a flexible coupling from the exterior of the fuel tank via the access opening, the flexible coupling to extend between the first end of the guide and the second end of the guide when the flexible coupling is positioned in the guide, the second end of the guide being positioned adjacent at least one of the second wall or the third wall, the second end of the guide being spaced from the access opening.

16. The apparatus of claim 15, wherein the guide is coupled to the fuel tank via a first connector adjacent the first end of the guide and a second connector adjacent the second end of the guide.

17. The apparatus of claim 15, where the first wall is an upper wall of the fuel tank.

18. An apparatus comprising:
a fuel tank having a plurality of walls defining a cavity;
an access opening formed through a first wall of the fuel tank to enable access to the cavity from an exterior of the fuel tank, the first wall being positioned between a second wall and a third wall;
a guide coupled to the first wall of the fuel tank, the guide having a length extending between the second wall and the third wall, the guide having a channel to form a pathway between a first end of the guide and a second end of the guide, the first end of the guide being positioned immediately adjacent the access opening to enable the channel to receive a flexible coupling from the exterior of the fuel tank via the access opening, the second end of the guide being positioned adjacent at least one of the second wall or the third wall, the second end of the guide being spaced from the access opening; and
a fuel component coupled to the flexible coupling, the flexible coupling to position the fuel component at the second end of the guide when the flexible coupling is positioned within the channel of the guide.

19. An apparatus comprising:
a fuel tank having a plurality of walls defining a cavity;
an access opening formed through a first wall of the fuel tank to enable access to the cavity from an exterior of the fuel tank, the first wall being positioned between a second wall and a third wall;
a guide coupled to the first wall of the fuel tank, the guide having a length extending between the second wall and the third wall, the guide having a channel to form a pathway between a first end of the guide and a second end of the guide, the first end of the guide being positioned immediately adjacent the access opening to enable the channel to receive a flexible coupling from the exterior of the fuel tank via the access opening, the second end of the guide being positioned adjacent at least one of the second wall or the third wall, the second end of the guide being spaced from the access opening, the channel defining a longitudinal axis that is non-parallel relative to a central axis of the access opening, the flexible coupling to slide along the longitudinal axis of the channel between the first end of the guide and the second end of the guide.

20. An apparatus comprising:
a fuel tank having a plurality of walls defining a cavity;
an access opening formed through a first wall of the fuel tank to enable access to the cavity from an exterior of the fuel tank, the first wall being positioned between a second wall and a third wall; and
a guide coupled to the first wall of the fuel tank, the guide having a length extending between the second wall and the third wall, the guide having a channel to form a pathway between a first end of the guide and a second end of the guide, the first end of the guide being positioned immediately adjacent the access opening to enable the channel of the guide to receive a flexible coupling from the exterior of the fuel tank via the access opening to position a fuel component at the second end of the guide when the flexible coupling is positioned within the channel of the guide, the second end of the guide being positioned adjacent at least one of the second wall or the third wall, the second end of the guide being spaced from the access opening.

* * * * *